United States Patent
Haglund et al.

(10) Patent No.: US 10,036,636 B2
(45) Date of Patent: Jul. 31, 2018

(54) POSITION DETERMINING UNIT AND A METHOD FOR DETERMINING A POSITION OF A LAND OR SEA BASED OBJECT

(71) Applicant: Vricon Systems Aktiebolag, Linkoeping (SE)

(72) Inventors: Leif Haglund, Brokind (SE); Johan Bejeryd, Linkoeping (SE); Bard Frostad, Goeteborg (SE)

(73) Assignee: Vricon Systems Aktiebolag, Linkoeping (SE)

( * ) Notice: Subject to any disclaimer, the term of this patent is extended or adjusted under 35 U.S.C. 154(b) by 99 days.

(21) Appl. No.: 14/440,492

(22) PCT Filed: Mar. 19, 2015

(86) PCT No.: PCT/SE2015/050325
§ 371 (c)(1),
(2) Date: May 4, 2015

(87) PCT Pub. No.: WO2016/148619
PCT Pub. Date: Sep. 22, 2016

(65) Prior Publication Data
US 2017/0082441 A1    Mar. 23, 2017

(51) Int. Cl.
*G01C 21/04* (2006.01)
*G01S 19/42* (2010.01)
(Continued)

(52) U.S. Cl.
CPC ........... *G01C 21/04* (2013.01); *G01C 21/005* (2013.01); *G01C 21/165* (2013.01); *G01C 21/20* (2013.01);
(Continued)

(58) Field of Classification Search
CPC ...... G01C 21/005; G01C 21/04; G01C 21/10; G01C 21/12; G01C 21/16; G01C 21/165;
(Continued)

(56) References Cited

U.S. PATENT DOCUMENTS 3,636,551 A * 1/1972 Maguire ................. G01C 21/22
4,954,837 A * 9/1990 Baird .................... G01C 21/005
342/458
(Continued)

FOREIGN PATENT DOCUMENTS

EP    1677076 A2    7/2006
EP    2133662 A2    12/2009
(Continued)

OTHER PUBLICATIONS

R. G. Deen et al., "Seeing in Three Dimensions: Correlation and Triangulation of Mars Exploration Rover Imagery"; Proceedings of the 2005 IEEE International Conference on Systems, Man and Cybernetics; vol. 1, pp. 911-916; year 2005.*
(Continued)

*Primary Examiner* — Bernarr E Gregory
(74) *Attorney, Agent, or Firm* — Alston & Bird LLP (57) ABSTRACT

The present disclosure relates to a position determining unit (800) for a land or sea based object and a method for determining a position. The position determining unit comprises or has access to a three dimensional map (802) comprising three dimensional geo-referenced position data. The position determining unit comprises further map part selector means (803) for selecting a part of the three dimensional map (802) so as to obtain a geo-referenced position associated to the selected part, at least one measurement instrument (805) arranged to obtain bearing and/or distance information related to the land or sea based object, and a computing and control unit (804) arranged to relate each
(Continued)

obtained bearing and/or distance information to a corresponding obtained geo-referenced position and to determine a geographical position of the land or sea based object based on the bearing and/or distance information and the corresponding obtained geo-referenced positions.

49 Claims, 6 Drawing Sheets

(51) Int. Cl.
| | |
|---|---|
| *G01S 19/20* | (2010.01) |
| *G01S 19/48* | (2010.01) |
| *G01C 21/16* | (2006.01) |
| *G01C 21/00* | (2006.01) |
| *G01C 21/30* | (2006.01) |
| *G01C 21/20* | (2006.01) |
| *G01S 19/00* | (2010.01) |

(52) U.S. Cl.
CPC .............. *G01C 21/30* (2013.01); *G01S 19/20* (2013.01); *G01S 19/42* (2013.01); *G01S 19/48* (2013.01)

(58) Field of Classification Search
CPC ........ G01C 21/20; G01C 21/26; G01C 21/28; G01C 21/30; G01C 21/22; G01C 15/002; G01S 19/01; G01S 19/13; G01S 19/20; G01S 19/38; G01S 19/39; G01S 19/42; G01S 19/48; G06K 9/0063
See application file for complete search history.

(56) References Cited

U.S. PATENT DOCUMENTS

| | | | |
|---|---|---|---|
| 6,512,976 B1 | 1/2003 | Sabatino et al. | |
| 7,136,726 B2* | 11/2006 | Greenfeld | G01C 21/005 |
| | | | 348/143 |
| 7,522,090 B2* | 4/2009 | Hawkinson | G01C 21/165 |
| | | | 342/173 |
| 8,554,478 B2* | 10/2013 | Hartman | G01S 19/48 |
| | | | 180/167 |
| 9,218,529 B2* | 12/2015 | Lewis et al. | G06K 9/0063 |
| 9,689,673 B2* | 6/2017 | Bejeryd et al. | G01C 15/002 |
| 2012/0203519 A1 | 8/2012 | Louis et al. | |

FOREIGN PATENT DOCUMENTS

| | | |
|---|---|---|
| WO | WO 2001/002804 A1 | 1/2001 |
| WO | WO 2011/058507 A1 | 5/2011 |

OTHER PUBLICATIONS

International Searching Authority, International Search Report and Written Opinion for International Application No. PCT/SE2015/050325, dated Nov. 24, 2015, 12 pages, Swedish Patent and Registration Office, Sweden.

\* cited by examiner

POSITION DETERMINING UNIT AND A METHOD FOR DETERMINING A POSITION OF A LAND OR SEA BASED OBJECT

CROSS REFERENCE TO RELATED APPLICATIONS

This application is a National Stage Application, filed under 35 U.S.C. § 371, of International Application No. PCT/SE2015/050325, filed Mar. 19, 2015, the contents of which are hereby incorporated by reference in their entirety.

BACKGROUND

Related Field

The present disclosure relates to a position determining unit for a land or sea based object.

The present disclosure further relates to a method for determining a position of a land or sea based object.

Description of Related Art

In land navigation for land-based vehicles, the common technique used is GPS navigation. However, sometimes the GPS signals are not available.

EP1677 076 relates to a navigation technique based on landmark navigation. In accordance with the disclosure of this document, landmarks are extracted from a sensor image and navigation is made based in the extracted landmarks.

BRIEF SUMMARY

One object of the present disclosure is to obtain an improved way of obtaining navigation for land based objects.

Embodiments of the present disclosure relate to a position determining unit for a land or sea based object. The position determining unit comprises or has access to a three dimensional map. The three dimensional map comprises three dimensional geo-referenced position data. The position determining unit comprises further map part selector means for selecting a part of the three dimensional map so as to obtain a geo-referenced position associated to the selected part. The position determining unit comprises further at least one measurement instrument arranged to obtain bearing and/or distance information related to the land or sea based object. The position determining unit comprises further a computing and control unit arranged to relate each obtained bearing and/or distance information to a corresponding obtained geo-referenced position and to determine a geographical position of the land or sea based object based on the bearing and/or distance information and the corresponding obtained geo-referenced positions.

Thereby, a position determining unit is provided which is not dependent on access to a radio based positioning system such as the Global Positioning System, GPS. The position can be provided without access to external information.

The position determined by the positioning determining unit can also be used for validating position information obtained from another system.

In one option, the bearing information comprises an azimuth angle value and/or an elevation angle value.

In one option, the computing and control unit is arranged to determine the geographical position of the land or sea based object in three dimensions. The bearing and/or distance information may then comprise at least three measurement values.

In one option, the computing and control unit is arranged to determine the geographical position of the land or sea based object in two dimensions. The bearing and/or distance information may then comprise at least two measurement values.

In one option, the position determining unit comprises further a sensor arrangement arranged to obtain sensor data comprising data related to a reference point associated to a corresponding obtained geo-referenced position. The computing and control unit is arranged to continuously update the geographical position of the land or sea based object based on the determined geographical position, based on a property of the reference point in first sensor data associated to the timing of the determination of the geographical position and based on changes in the property of the reference point in continuously updated second sensor data.

One advantage with this solution is that the geo-referenced position can be updated based on information from the sensor arrangement and no other information.

In one option, the computing and control unit is arranged to continuously update the geographical position of the land or sea based object based on the obtained geo-referenced position of the reference point.

In one option, at least one of the measurement instrument(s) comprises the sensor arrangement.

In one option, the sensor arrangement is locked at the reference point having a corresponding obtained geo-referenced position.

In one option, the computing and control unit is arranged to calibrate or reset bearing and/or position information obtained by the at least one measurement instrument based on the obtained geo-referenced positions.

In one option, the at least one measurement instrument comprises a Laser Range Finder, LRF and/or a radar unit and/or an electro-optical instrument and/or an optical sight.

In one option, the obtained geo-referenced position relates to the current position of the position determining unit. The computing and control unit is then arranged to determine the geographical position of the land or sea based object based on the obtained geo-referenced position relating to the current position of the position determining unit.

In one option, the means for selecting a part of the three dimensional map comprises a user interface for manually indicating whether the selected part of the three dimensional map relates to a current position of the position determining unit or to the bearing and/or distance information obtained by the at least one measurement instrument.

In one option, the position determining unit comprises at least one position obtaining unit arranged to obtain position data related to the current position of the land or sea based object. The computing and control unit is then arranged to determine the geographical position of the land or sea based object based on the position data obtained by the position obtaining unit.

In one option, the computing and control unit is arranged to calibrate or reset the position data obtained by the at least one position obtaining unit with the geo-referenced position associated with the selected part.

In one option, the at least one position obtaining unit comprises an Inertial Measurement Unit, IMU and/or an odometer and/or a receiver for a radio based global positioning system such as GPS.

In one option, the computing and control unit is arranged to determine an uncertainty measure related to the determined geographical position of the land or sea based object.

In one option, the position obtaining unit and/or the measurement instrument is reset/calibrated when the uncertainty measure decreases below a pre-set value.

In one option, the computing and control unit is arranged to receive second position information related to the land or sea based object from a second source such as a radio based global positioning system, e.g. GPS. The computing and control unit is further arranged to determine a difference between the second position information obtained from the second source and the determined position or obtained update of the position of the land or sea based object.

The computing and control unit is further arranged to detect an uncertainty in the obtained second position information when the difference exceeds a predetermined value.

Embodiments of the present disclosure also relate to a method for determining a position of a land or sea based object. The method comprises the steps of
- bearing and/or distance information related to the land or sea based object by means of at least one measurement instrument,
- determining for the obtained bearing and/or distance information an associated part of a three dimensional map comprising three dimensional geo-referenced position data,
- obtaining a geo-referenced position for each determined part of the three dimensional map, and
- determining a geographical position of the land or sea based object based on the obtained bearing and/or distance information and corresponding obtained geo-referenced positions.

In one option, the bearing information comprises an azimuth angle value and/or an elevation angle value.

In one option, the geographical position of the land or sea based object is determined in three dimensions. The bearing and/or distance information comprises then at least three measurement values.

In one option, the geographical position of the land or sea based object is determined in two dimensions. The bearing and/or distance information comprises then at least two measurement values.

In one option, the obtained geo-referenced position relates to the current position of the land or sea based object. The determining of the geographical position of the land or sea based object is then based on the obtained geo-referenced position relating to the current position of the land or sea based object.

In one option, the step of determining a part of the three dimensional map comprises manually indicating whether the determined map part of the three dimensional map relates to the current position of the land or sea based object or the bearing and/or distance information obtained by the at least one measurement instrument.

In one option, the method further comprises a step of obtaining position data related to a current position of the land or sea based object by means of at least one position obtaining unit. The geographical position of the land or sea based object is then determined based on the obtained position data.

In one option, the method comprises a step of resetting or calibrating the at least one measurement instrument and/or position obtaining unit. The step of resetting or calibrating the at least one position obtaining unit and/or measurement instrument may then be based on the obtained geo-referenced position associated with at least one of the selected parts of the three-dimensional map.

In one option, the method comprises a step of determining an uncertainty measure related to the determined position of the land or sea based object.

In one option, the method further comprises obtaining first sensor data associated to the timing of the determined geographical position, wherein the first sensor data comprises data related to a reference point associated to at least one property and associated to a corresponding obtained geo-referenced position. Thereafter steps of obtaining updated second reference data comprising data related to the reference point, and obtaining an update of the geographical position of the land or sea based object based on the determined geographical position of the land or sea based object and based on a relation in the at least one property between the first sensor data and the updated second sensor data are performed are performed repeatedly. A step of determining an uncertainty in the obtained update of the geographical position may be performed. Updating of the geographical position may then be ended when the uncertainty exceeds a predetermined threshold.

In one option, the method comprises steps of obtaining second position information related to the land or sea based object from another source such as a radio based global positioning system, e.g. GPS and determining a difference between the second position information obtained from another source and the determined position or obtained update of the position of the land or sea based object. A step of detecting an uncertainty in the obtained second position information when the difference exceeds a predetermined value may also be performed.

DETAILED DESCRIPTION OF VARIOUS EMBODIMENTS

Figure 1:
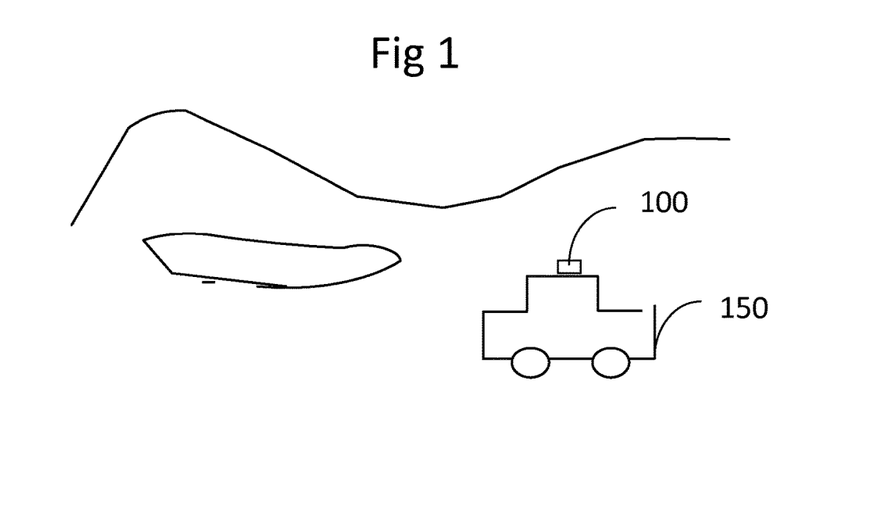
FIG. 1 illustrates an example of a land based object with a position determining unit.

In FIG. 1 a land or sea based object 150 in the form of a land based vehicle comprises a position determining unit 100. In a not illustrated example, land or sea based object 150 is a sea based vehicle. In one not illustrated example, the object is a person. The position determining unit 100 is in one example formed in a single unit. The position determining unit 100 is in one example formed by a plurality of physically separated parts in communication with each other. The physically separated parts are in communication wirelessly or by wire. The position determining unit 100 is arranged to obtain a geographical position of the land or sea based object. In one example, the position determining unit 100 is used as a complement to one or more other instruments obtaining position information related to the object. The position determining unit 100 comprises or has access to a three dimensional map comprising three dimensional geo-referenced position data. At least one measurement instrument is arranged to obtain bearing and/or distance information. Map part selector means are used for selecting a part of the three dimensional map. Thus, each bearing and/or distance information is related to a corresponding selected part of the three-dimensional map. The map part selector means comprises in one example a user interface for manually selecting the part of the three dimensional map. The map part selector means comprises in one alternative or complementing example a three dimensional map data processing unit arranged to process the three dimensional map based on obtained bearing(s)/distance(s) to at least partly perform automatic selection of the corresponding parts of the three dimensional map. The three dimensional map data processing unit is in one example arranged to perform the selection based on a rough initial value of the current position of the position determining unit. This rough initial value of the current position is in one example inputted manually via a user interface. A control and computing unit is arranged to determine a geographical position of the ground or sea based object based on the bearing and/or distance information and corresponding obtained geo-referenced positions. The control and computing unit or map part selector means relates each bearing and/or distance to its corresponding obtained geo-referenced position as selected by the user via the user interface.

The term "bearing" is herein intended to be interpreted broadly. The term includes the angle between the magnetic North (magnetic bearing) or true North (true bearing) and an object. For example, an object to the East would have an absolute bearing of 90 degrees. The term "bearing" as used herein also includes a relative bearing referring to the angle between a reference to a local coordinate system such as the object's forward direction, and the location of another object. For example, an object relative bearing of 0 degrees would be dead ahead; an object relative bearing 180 degrees would be behind. When bearing is determined in relation to a local coordinate system, the position determining unit has information about a present relation between the used local coordinate system and the georeferenced coordinate system. The bearing includes in one example an azimuth angle and an elevation angle. The bearings are for example measured in degrees.

Figure 2A:
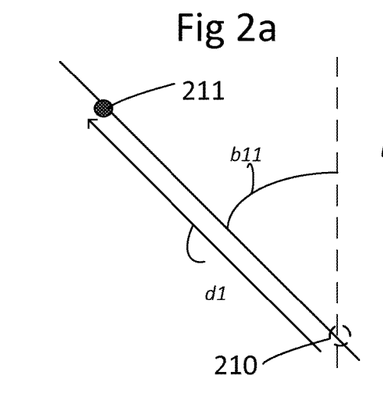
FIG. 2 illustrates schematically determination of the position of a land or sea based object according to a first example.
Figure 2B:
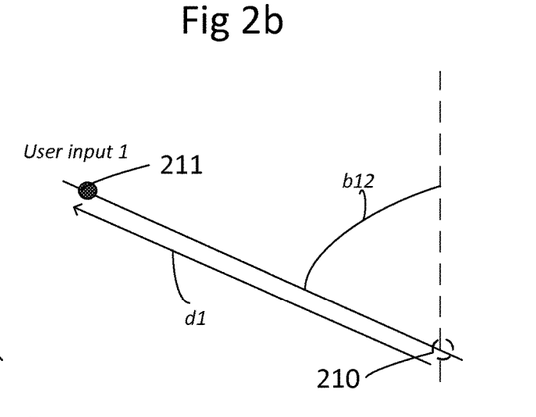

FIGS. 2a and 2b illustrates an example wherein a current position 210 of a land or sea based object is obtained based on a bearing and distance measurement. In the illustrated example, the bearing comprises an azimuth angle and an elevation angle. FIG. 2a illustrates a view from above wherein an azimuth angle b11 has been determined. FIG. 2b illustrates a side view wherein an elevation angle b12 has been determined. In the illustrated FIGS. 2a and 2b, a geo-referenced reference position 211 is associated to the bearing, i.e. the azimuth angle b11 and the elevation angle b12. Further a distance d1 between the current position 210 and the geo-referenced reference position 211 is determined. In different embodiments, the geo-referenced reference position 211 is a three dimensional coordinate. In different embodiments, the geo-referenced reference position 211 is inputted via a user interface. The user interface is operatively connected to a three dimensional map comprising three dimensional geo-referenced position data, wherein a part of the three dimensional map is selected as the geo-referenced reference position 211 based on the user input. In different embodiments, the geo-referenced reference position 211 is obtained via an at least partly automated process based on the three dimensional map comprising three dimensional geo-referenced position data and based on the obtained azimuth angle, elevation angle and distance. In one example, the geo-referenced reference position 211 is determined also based on a rough initial value of the current position 210 of the position determining unit. This rough initial value of the current position 210 is in one example inputted manually via the user interface. Thus, the geo-referenced reference position 211 provides information for placing the measurement including azimuth angle b11, elevation angle b12 and distance d1 in the geography. A geographical coordinate of the current position 210 of the land or sea based object is determined based on the geo-referenced reference position 211, the azimuth angle b11, the elevation angle b12 and the distance d1. The geographical coordinate of the current position 210 of the land or sea based object is in one example determined in three dimensions. The geographical coordinate of the current position 210 of the land or sea based object is in one example determined in two dimensions. In accordance with a not shown example, only two of the three measured entities (azimuth angle b11, elevation angle b12 and distance d1) are used in determining the geographical coordinate of the current position 210. For example, in a sea based application related to determining the position of a sea based object, the height coordinate is characteristically less relevant.

Figure 3:
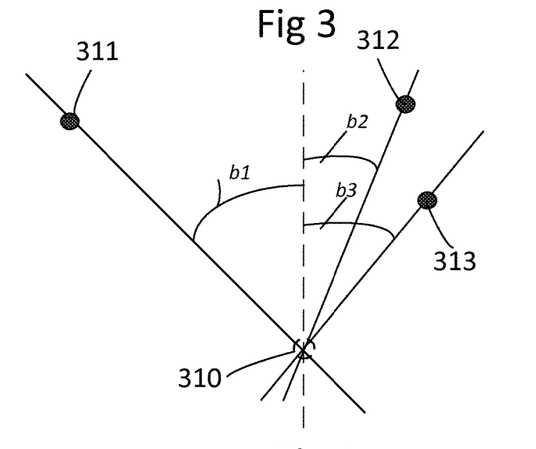
FIG. 3 illustrates schematically determination of the position of a land or sea based object according to a second example.

FIG. 3 illustrates an example wherein a current position 310 of a land or sea based object is obtained based on bearing measurements and based on triangulation. In this illustrated example, the current position 310 of the land or sea based object is obtained based on bearing measurements in three directions. In different embodiments, the position 310 of the land or sea based object can be obtained in a three dimensional coordinate system. In the illustrated figure, a first bearing, b1, is determined. Further, a first geo-referenced, reference 311 is associated to the first bearing, b1. Further, a second bearing, b2, is determined. Further, a second geo-referenced reference position 312 is associated to the second bearing, b2. Yet further, a third bearing, b3, is determined. Further, a third geo-referenced reference position 313 is associated to the third bearing, b3. Thus, the respective geo-referenced reference positions 311, 312, 313 provides information for placing the respective bearing in the geography. The position 310 of the land or sea based object is located at a location where the bearings cross each other. A geographical coordinate of this position 310 is determined based on the three dimensional coordinates of the first, second and third georeferenced reference positions 311, 312, 313 and based on the location of the crossing of the bearings in relation to the respective geo-referenced reference positions 311, 312, 313. In one example, the determined geographical coordinate of the current position 310 is determined in three dimensions. In one example, the bearing comprises an azimuth angle. In one example, the bearing comprises an elevation angle. In one example, the bearing comprises at least for one of the bearings an azimuth angle and an elevation angle.

In one example (not illustrated) the position 310 of the land or sea based object is obtained based on bearing measurements in more than three directions. In a not illustrated example, the position 310 of the land or sea based object is obtained based on measurements of at least three different angles, i.e. azimuth and/or elevation angles not necessarily measured in at least three different directions. In measuring three different angles, the geographical coordinate of the current position 310 can be determined in three dimensions. In a not illustrated example, the position 310 of the land or sea based object is obtained based on measurements of at least two different angles, i.e. azimuth and/or elevation angles not necessarily measured in at least two different directions. In measuring two different angles, the geographical coordinate of the current position 310 can be determined in two dimensions.

Figure 4:
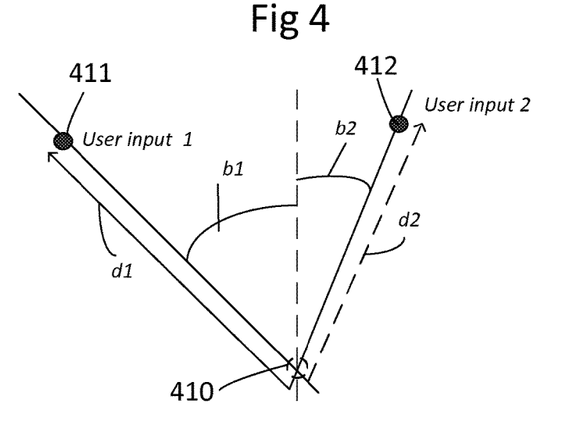
FIG. 4 illustrates schematically determination of the position of a land or sea based object according to a third example.

Also FIG. 4 illustrates an example wherein a position 410 of a land or sea based object is obtained based on bearing measurements. Further, the position 410 of the land or sea based object is obtained based on distance measurement(s). Also in FIG. 4, the position of the land or sea based vehicle is obtained based on triangulation. In different embodiments, the position 410 of the object can be obtained in a three dimensional coordinate system. In the illustrated figure, a first bearing, b1, and a first distance, d1, are determined. Further, a first geo-referenced reference position 411 is associated to the first bearing, b1 and first distance, distance 1. Further, a second bearing, b2 is determined. A second distance, d2, may also be determined related to the second bearing b2. Further, a second geo-referenced reference position 412 is associated to the second bearing, b2 and optional second distance, d2. Thus, the respective geo-referenced reference position 411, 412 provides information for placing the respective bearing in the geography. As described in relation to FIG. 3, the position 410 of the land or sea based object is located at a position where the bearings cross each other. A geographical coordinate of this position is determined based on the three dimensional coordinates of the first and second geo-referenced reference positions 411, 412, and based on the location of the crossing of the bearings in relation to the respective georeferenced reference positions and the determined distance(s). In one example, for at least one of the bearings, the bearing comprises an azimuth angle. In one example, for at least one of the bearings, the bearing comprises an azimuth angle. In one example, for at least one of the bearings, the bearing comprises an elevation angle. In one example, for at least one of the bearings, the bearing comprises an azimuth and an elevation angle. In one example, the determined geographical coordinate 410 is determined in three dimensions. In one example, the determined geographical coordinate 410 is determined in two dimensions.

In one example, distance information is measured and used in determining the position 411 for one of the bearings. In one example, the position 410 of the land or sea based object is obtained based on bearing measurements in more than two directions In one example (not illustrated), distance information is measured and used in determining the position 411 for some of the plurality of bearings. When determining the current position 410 based on the bearings and triangulation, the distance measurements may then be used for support in determining the current position 410 so that an uncertainty in the determination of the current position 410 using triangulation can be decreased.

Figure 5:
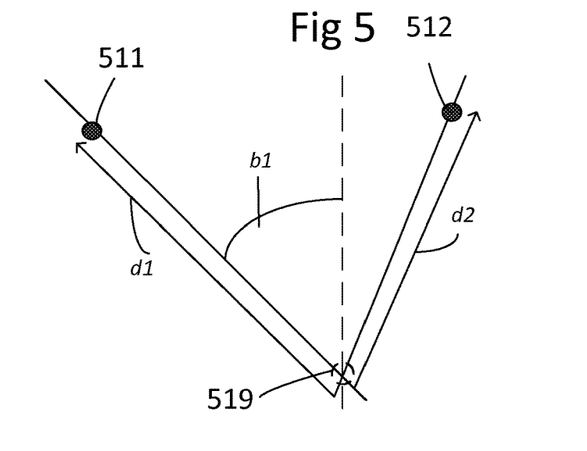
FIG. 5 illustrates schematically determination of the position of a land or sea based object according to a fourth example.

Also FIG. 5 illustrates an example wherein a position 510 of a land or sea based object is obtained based on bearing and distance measurements. In the illustrated figure, a first bearing, b1, is determined. Also, a first distance, d1, is determined. Further, a first geo-referenced reference position 511, is associated to the first bearing b1 and first distance d1. Also, a second distance, d2, is determined related to a measurement in another direction. Further, a second geo-referenced reference 512 is associated to the second distance, d2. The geo-referenced coordinate of the current position 510 is determined in a manner equivalent to that described in relation to FIGS. 2-4.

Figure 6:
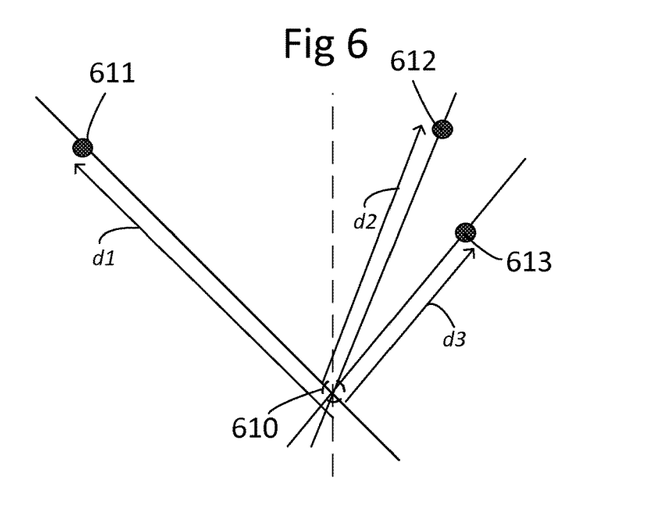
FIG. 6 illustrates schematically determination of the position of a land or sea based object according to a fifth example.

FIG. 6 illustrates an example wherein a position 610 of a land or sea based object is obtained based on distance measurements. In the illustrated figure, a first distance, d1, is determined Further, a first geo-referenced reference position 611 is associated to the first distance d1. Further, a second distance, d2, is determined. A second geo-referenced reference position 611 is associated to the second distance d2. Further, a third distance, d3, is determined. A third geo-referenced reference position 611 is associated to the third distance d2. The geo-referenced coordinate of the current position 610 is determined in a manner equivalent to that described in relation to FIGS. 2-5.

Figure 7:
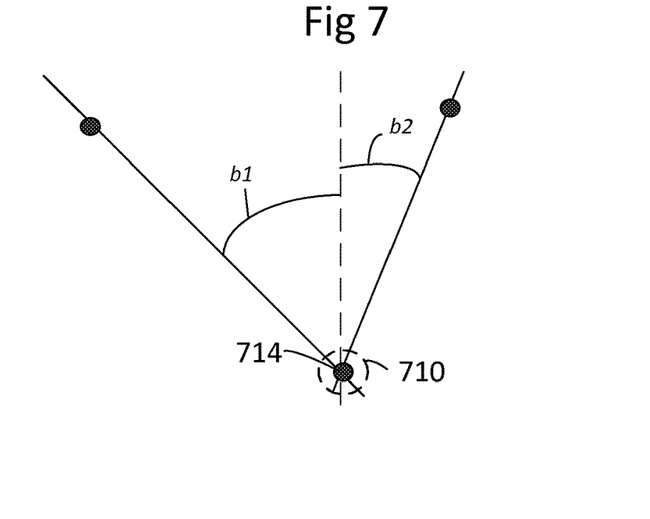
FIG. 7 illustrates schematically determination of the position of a land or sea based object according to sixth example.

FIG. 7 illustrates an example wherein a position 710 of a land or sea based object is obtained based on bearing and/or distance measurements. The position 710 is in one example determined as disclosed in relation to any or a combination of the FIGS. 2-6. Further, a fourth geo-referenced reference position 714 is associated to the present location of the land or sea based object. The fourth geo-referenced reference position 714 forms an independent source for obtaining the position of the land or sea based object. If the fourth geo-referenced reference position 714 differs from the determined geographical coordinate of this position more than a predetermined threshold; the obtaining of the bearings (and/or distances, not shown in the figure) is in one example calibrated.

With reference to FIGS. 2-7, one or a plurality of bearing and/or distance measurements may in different embodiments be made geo-referenced reference position. A resultant bearing and/or distance for each user inputted position is then determined based on the made measurements. The resultant bearing and/or distance is for example obtained based on averaging or a least square technique.

Figure 8:
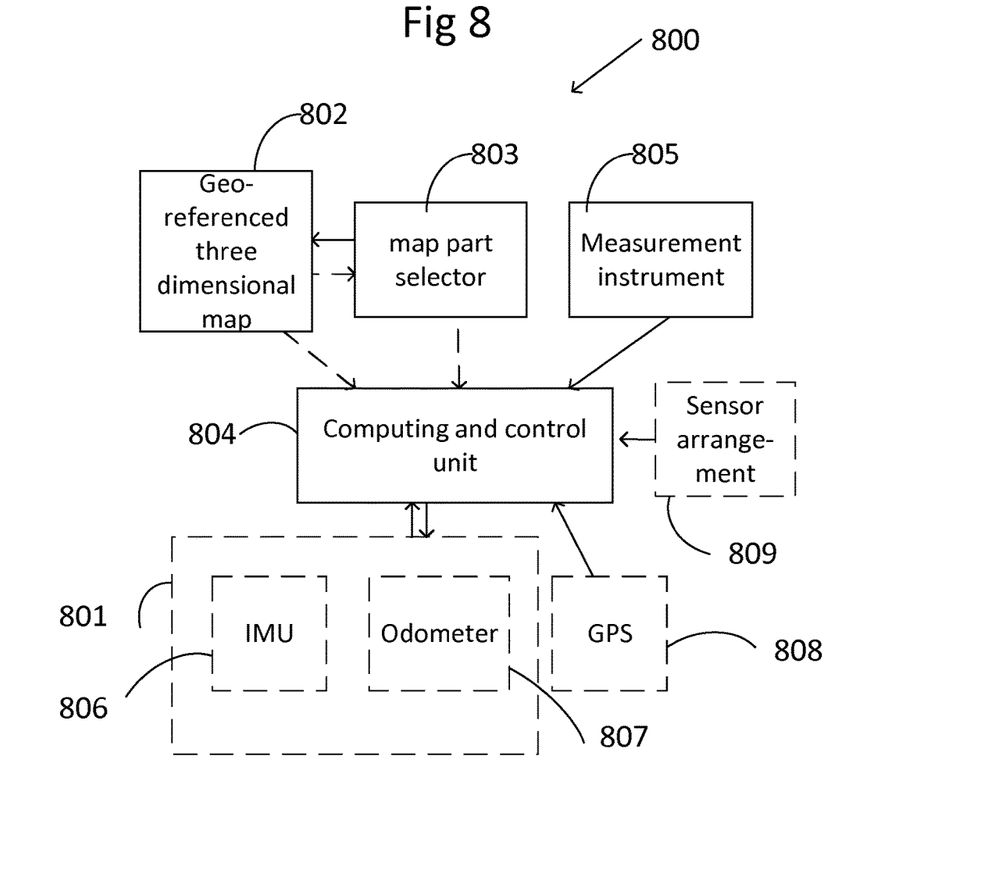
FIG. 8 shows a block scheme illustrating an example of a position determining unit.

In FIG. 8, a position determining unit 800 for a land or sea based object comprises or is associated to a geo-referenced three dimensional map 802. The three dimensional map 802 comprises three dimensional geo-referenced position data. The position determining unit further comprises a map part selector 803. The map part selector 803 is arranged to select or determine a part of the three dimensional map. The map part selector 803 comprises in one example a user interface arranged to present a geo-referenced three-dimensional map to a user. The user interface is further arranged to receive user input and to determine a geo-referenced position of a user selected part or object in the three-dimensional map based on the user input. The user interface is in one example a 3D map presentation and marking device. The map part selector 803 comprises in one alternative or complementing example a three dimensional map data processing unit arranged to process the three dimensional map based on obtained bearing(s)/distance(s) to at least partly perform automatic selection of the corresponding parts of the three dimensional map. The three dimensional map data processing unit is in one example arranged to perform the selection based on a rough initial value of the current position of the position determining unit. This rough initial value of the current position is in one example inputted manually via the user interface.

The position determining unit 800 comprises further at least one measurement instrument 805. The at least one measurement instrument 805 is arranged to obtain bearing and/or distance information. Each bearing and/or distance information is related to a corresponding selected part of the three-dimensional map 802. The at least one measurement instrument 805 comprises for example a Laser Range Finder, LRF, and/or a radar unit and/or an electro-optical instrument and/or an optical sight. The bearing information comprises in one example an azimuth angle value and/or an elevation angle value.

A control and computing unit 804 is arranged to determine a geographical position of the land or sea based object based on the bearing and/or distance information from measurements with the measurement instrument and based on selected parts of the three dimensional map, wherein each selected part is related to one of the bearings and/or distances. In doing so, the computing and control unit 804 is arranged to relate each bearing and/or distance information to a corresponding obtained geo-referenced position.

The computing and control unit 804 is in one example arranged to determine the geographical position of the land or sea based object in two dimensions. Then, the bearing and/or distance information comprises at least two measurement values.

The computing and control unit 804 is arranged to determine the geographical position of the land or sea based object in three dimensions. The bearing and/or distance information comprises then at least three measurement values.

The computing and control unit 804 is in one example arranged to determine an uncertainty measure related to the position of the land or sea based object. The computing and control unit is in one example arranged to calibrate or reset bearing and/or position information obtained by the at least one measurement instrument 805 based on the geo-referenced position associated with the selected part of the three-dimensional map.

In one example, the selected part of the three dimensional map 802 relates to the current position of the position determining unit 800. The computing and control unit 804 may then be arranged to determine the geographical position of the land or sea based object based on the selected part of the three dimensional map 602 relating to the current position of the position determining unit 800. In one example, the user interface 803 comprises means for manually indicating whether the selected part of the three dimensional map 802 relates to a current position of the position determining unit 800 or to the bearing and/or position information obtained by the at least one measurement instrument 805.

In one example, the position determining unit 800 comprises further at least one position obtaining unit 801. The position obtaining unit 800 is arranged to obtain position data related to the current position of the land or sea based object. The computing and control unit 804 is arranged to determine the geographical position of the land or sea based object based on the position data obtained by the position obtaining unit 801. The computing and control unit 804 is arranged to calibrate or reset the position data obtained by the at least one position obtaining unit 801 with the geo-referenced position associated with the selected part The at least one position obtaining unit comprises for example an Inertial Measurement Unit, IMU 806 and/or an odometer 807 and/or a GPS-receiver 808. In one example, the at least one position obtaining unit and/or the measurement instrument is reset/calibrated when the uncertainty measure is close to zero. In one example, the at least one position obtaining unit and/or the measurement instrument is reset/calibrated with the geo-referenced position associated with the selected part The position determining unit further comprises in one example a sensor arrangement 809 comprising one or a plurality of sensors. The sensor arrangement 809 comprises in one example an image capturing unit. The image capturing unit is arranged to obtain images having a reference point associated to a corresponding obtained geo-referenced position. The computing and control unit 804 is arranged to continuously update the geographical position of the land or sea based object based on the determined geographical position, based on at least one property of the reference point in a first image associated to the timing of the determination of the geographical position and based on changes in the at least one property of the reference point in continuously updated second images. The computing and control unit 804 is in one example arranged to continuously update the geographical position of the land or sea based object also based on the obtained geo-referenced position of the reference point. In an alternative or complementing example, the sensor arrangement comprises another type of sensor such as radar, lidar etc. In one example, at least one of the measurement instrument(s) 805 comprises the sensor arrangement 809. The sensor arrangement such as image capturing unit 809 is in one example then locked at the reference point having a corresponding obtained geo-referenced position.

Figure 9:
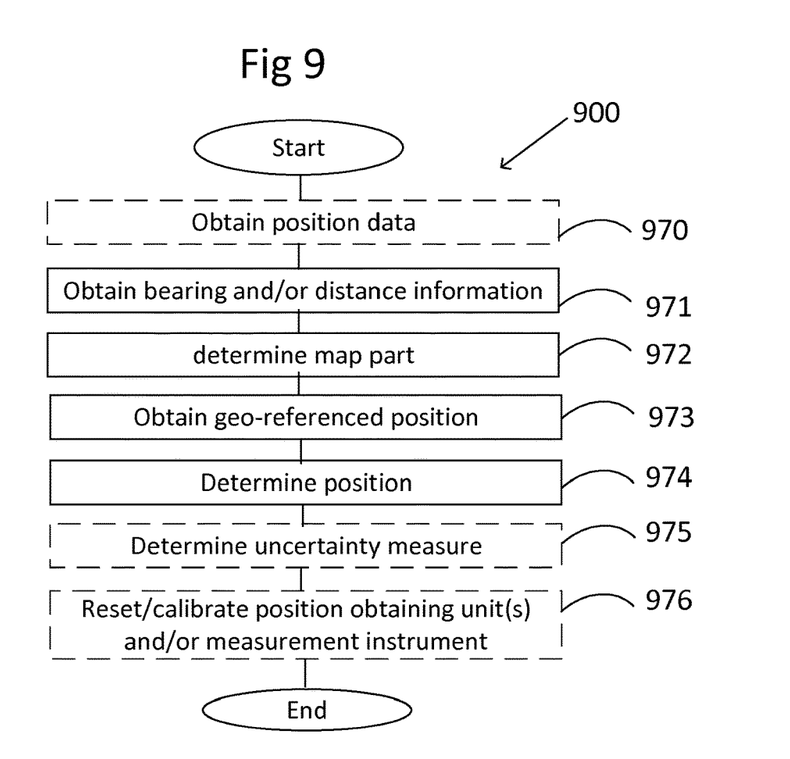
FIG. 9 shows a flow chart illustrating an example of a method for determining a position of a land or sea based object.

FIG. 9 illustrates an example of a method 900 for determining a position of a land or sea based object. The method comprises a step of obtaining bearing and/or distance information 971 by means of at least one measurement instrument. The bearing information comprises in one example an azimuth angle value and/or an elevation angle value. The method further comprises steps determining 972 for the obtained bearing and/or distance information an associated part of a three dimensional map comprising three dimensional geo-referenced position data, and obtaining a geo-referenced position 973 for each determined part of the three dimensional map.

The method further comprises a step of determining a geographical position 974 of the land or sea based object based on the obtained bearing and/or distance information and corresponding obtained geo-referenced positions. The step of determining the geographical position is in one example performed in accordance with the principles discussed in any of or a combination of the FIGS. 2-7.

The geographical position of the land or sea based object is in one example determined in two dimensions. The bearing and/or distance information comprises then at least two measurement values.

The geographical position of the land or sea based object is in one example determined in three dimensions. The bearing and/or distance information comprises at least three measurement values.

In one example, a part of the three dimensional map is determined relating to the current position. The obtained geo-referenced position 973 then relates to the current position of the land or sea based object. The determining of the geographical position 974 of the land or sea based object can then also be based on the obtained geo-referenced position relating to the current position of the land or sea based object. In one example, the step of determining the map part comprises manually selecting the map part by means of a user interface. The step of manually selecting a part of the three dimensional map comprises in one example manually indicating whether the selected part of the three dimensional map relates to the current position of the land or sea based object or the bearing and/or distance information obtained by the at least one measurement instrument.

In the illustrated example of the figure, the method comprises further in different embodiments a step of obtaining position data 970 related to a current position of the land or sea based object by means of at least one position obtaining unit. The geographical position of the land or sea based object is then determined based on the obtained position data 790.

In the illustrated example, the method comprises a step of resetting or calibrating 976 the at least one position obtaining unit and/or measurement instrument(s) based on the obtained geo-referenced position associated with the determined part of the three-dimensional map.

In the illustrated example, the method comprises a step of determining an uncertainty measure 975 related to the determined position of the land or sea based object. The at least one measurement instrument and/or position obtaining unit may then be reset or calibrated when the uncertainty measure decreases below a pre-set value.

The steps described above can be performed in another order than the order presented in FIG. 9.

Figure 11:
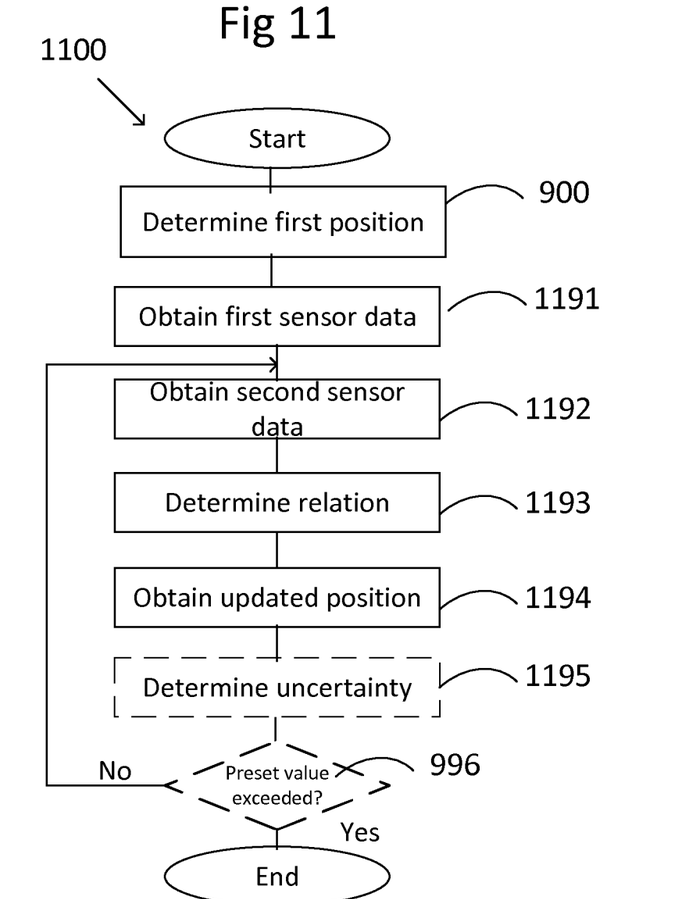
FIG. 11 shows a flow chart illustrating an example of a method for updating a determined position.

FIG. 11 shows a method for navigation of a land or sea based object. In a first step, the position of the object is determined 900. The determining of a position of a land or sea based object comprises obtaining bearing and/or distance information related to the land or sea based object by means of at least one measurement instrument, determining for the obtained bearing and/or distance information an associated part of a three dimensional map comprising three dimensional geo-referenced position data, obtaining a geo-referenced position for each determined part of the three dimensional map, and determining a geographical position of the land or sea based object based on the obtained bearing and/or distance information and corresponding obtained geo-referenced positions. Examples of how to determine the position of the land or sea based object are for example described in relation to FIG. 9. In one example, the position of the sea or land based object is determined using any method such as use of a radio based global positioning system.

The method further comprises a step of obtaining first sensor data 1191 associated to the timing of the determination of the geographical position. The first sensor data comprises data related to a reference point associated to at least one property. The at least one property comprises in one example the position of the reference point in the first sensor data The reference point is in one example further associated to a corresponding obtained geo-referenced position. The first senor data is in one example a first image. The at least one property comprises in one example the position of the reference point in the image. The at least one property comprises in one example an angular relation of the reference point to an imagined axis in the image.

The method further comprises steps of repeatedly obtaining 1192 updated second reference data comprising data related to the reference point. The second sensor data is in one example a second image.

The method further comprises a step of obtaining 1194 an update of the geographical position of the land or sea based object. The update of the geographical position of the land or sea based object is based on the determined geographical position of the land or sea based object. A relation is determined 1193 between the at least one property of the first sensor data and the updated second sensor data. The update of the geographical position of the land or sea based object is further based on the determined relation between the at least one property of the first sensor data and the updated second sensor data. Accordingly, the position of the land or sea based object can be continuously updated by means of continuously updated sensor data as long as the at least one property can be discriminated from the sensor data.

In a further step, an uncertainty is determined 1195 for each update of the second sensor data or with another interval. For example, an uncertainty is determined for every tenth update of the second sensor data. The uncertainty relates to the uncertainty in the obtained update of the geographical position. Updating of the geographical position is ended when the uncertainty in the obtained update of the geographical position exceeds a predetermined threshold. When the threshold has been exceeded, positioning of the land or sea based object is in one example executed as disclosed in relation to FIG. 9.

Figure 12:
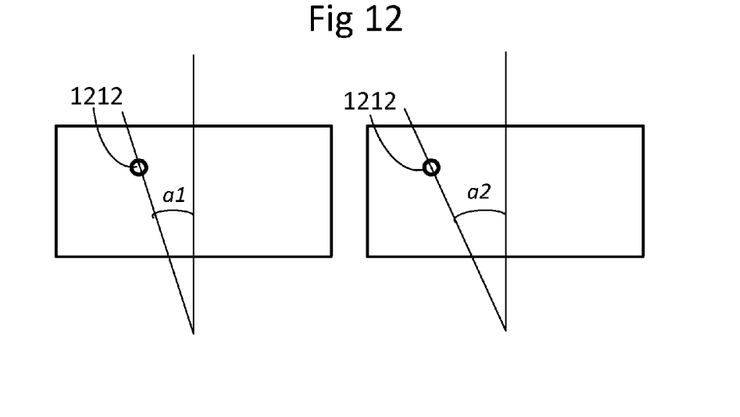
FIG. 12 shows an example of first sensor data (to the left) and updates second sensor data (to the right) obtained by means of a sensor arrangement

FIG. 12 shows first sensor data (to the left) and updates second sensor data (to the right) obtained by means of a sensor arrangement. The first sensor data has a property in the form of a reference object 1212 positioned at a first position/angle a1 of the sensor data. In the illustrated example, the first sensor data is a first sensor image. The second sensor data (to the right) has a property in the form of a reference object 1212 positioned at a second position/angle a2 of the sensor data. In the illustrated example, the second sensor data is a second sensor image. An updated geographical position of the land or sea based object is then determined based on a relation between the first and second positions/angles a1, a2 of the first and second sensor data. In an alternative example (not shown), the sensor arrangement is arranged to lock on the reference object such that the reference object always is positioned at the same position/angle in the sensor data/image. The sensor arrangement may then be arranged on a rotatable platform arranged to rotate into a position wherein the reference object is fixed in the sensor data/image. An updated geographical position of the land or sea based object is then determined based on a rotational position of the rotatable platform. That is to say the rotational position of the platform is updated for each second sensor data/second image and the rotational position is compared to the rotational position for the first sensor data/first image to form a rotational difference. The updated geographical position of the land or sea based object is then determined based on the rotational difference.

Figure 10:
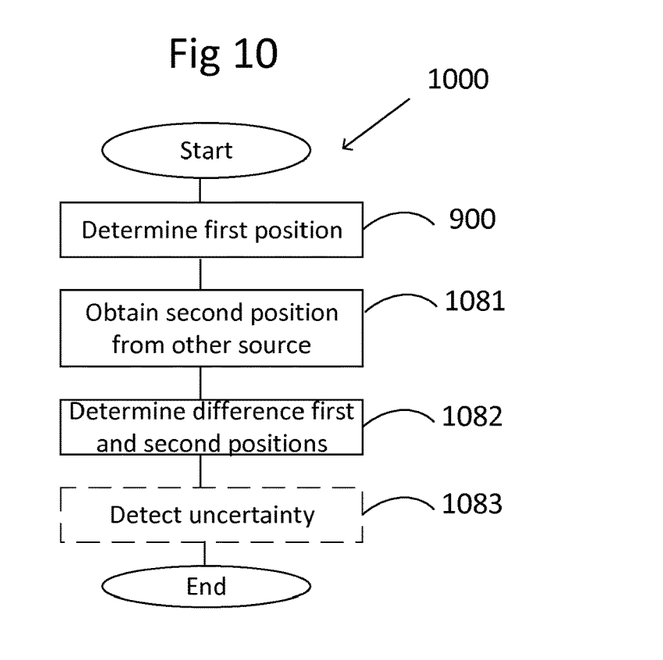
FIG. 10 shows a flow chart illustrating an example of a method for comparing positions of a land or sea based object obtained using one method with a position obtained using another method.

In FIG. 10, a method 1000 for comparing different sources providing position information related to a land or sea based object is illustrated. In a first step, a first position of the object is determined 900 using a first technique. The determining of the first position 900 comprises in one example obtaining bearing and/or distance information related to the land or sea based object by means of at least one measurement instrument, determining 972 for the obtained bearing and/or distance information an associated part of a three dimensional map comprising three dimensional geo-referenced position data, obtaining a geo-referenced position 973 for each determined part of the three dimensional map, and determining 974 a geographical position of the land or sea based object based on the obtained bearing and/or distance information and corresponding obtained geo-referenced positions. Examples of how to determine the position of the land or sea based object are for example described in relation to FIG. 9.

The method 1000 further comprises a step of obtaining corresponding second position information 1081 from another source. In one example, the step of obtaining corresponding second position information 1081 comprises obtaining the position information using a radio based global positioning system. In one example, the radio based global positioning system is a satellite based global positioning system such as GP.

The method 1000 further comprises a step of determining a difference 1082 between the second position information obtained from another source and the determined position or obtained update of the position of the land or sea based object and the second position information obtained from another source.

In one example the method further comprises a step of evaluating 1083 the determined difference. In one example the evaluation involves determining whether the difference exceeds a predetermined distance. In one example, the other source is determined to be unreliable if the predetermined distance is exceeded.

Figure 13:
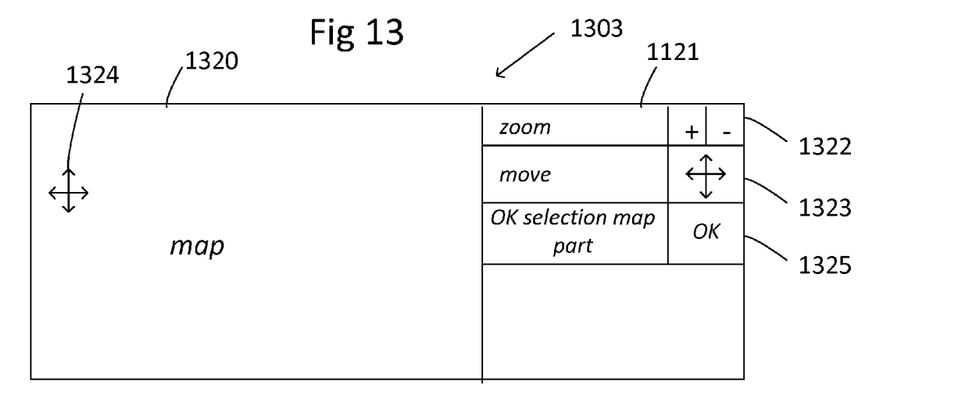
FIG. 13 illustrates schematically a first example of a display of a three dimensional map and a user interface.

In FIG. 13 a user interface 1303 comprises a display 1320 or screen arranged to present a geo-referenced three-dimensional map to a user. The user interface 1103 is further arranged to receive user input and to determine a geo-referenced position of a user selected part or object in the three-dimensional map based on the user input. The display 1120 is in one example a combined is in one example a 3D map presentation and marking device.

The user interface 1303 is in one example wearable. The wearable user interface is in one example comprised in a mobile phone. In one example, the user interface has a similar size as a mobile phone. In one example, display 1320 comprises a touch screen arranged to present the 3D-map to the observer and to receive input from the user via the touch screen so as to mark a selected part of the map. In one example the user interface 1303 comprises a user input module 1321 for receiving input from the user. The user input module comprises in one example a user control part 1321 for controlling display of the 3D map. The user control part 1321 comprises in one example a zoom function 1322 and/or a move function 1323 for controlling a section of the 3D map which is displayed on the display 1320. The user control part 1321 comprises further in one example a computer mouse or joystick (not shown). The user interface 1303 comprises in one example a cursor 1324 presented on the display 1320. The cursor 1324 is in one example controlled by the computer mouse or joystick. In one example, selection of a part of the three-dimensional map is in one example performed by means of the computer mouse or joystick. In one example, the user control part 1321 comprises a button or the like 1325 for selection of a map part, which the cursor 1324 marks. In one example the user interface 1303 has a screen of bigger size than ordinary mobile phones for facilitating easier and more accurate marking by the user. In one example the user interface 1303 is arranged to present information to glasses and/or a head-worn display of the user. The term wearable refers to the possibility of being able to easily transporting user interface 1303. This means that it is not necessary that the user interface 1303 is stationary for example within a vehicle. It also refers to the fact that the user interface 1303 has the right size and weight to be actually transportable by a human being without any bigger burden, even under longer time.

The user interface 1303 is arranged to determine coordinates of a selected part of the 3D map based on the user made selection of a part of the 3D map. The selection of a part of the 3D map allows conversion of that part into 3D coordinates. The user interface comprises in one example memory for the 3D map. In one example the user interface comprises calculation means, for example a processor.

Figure 14:
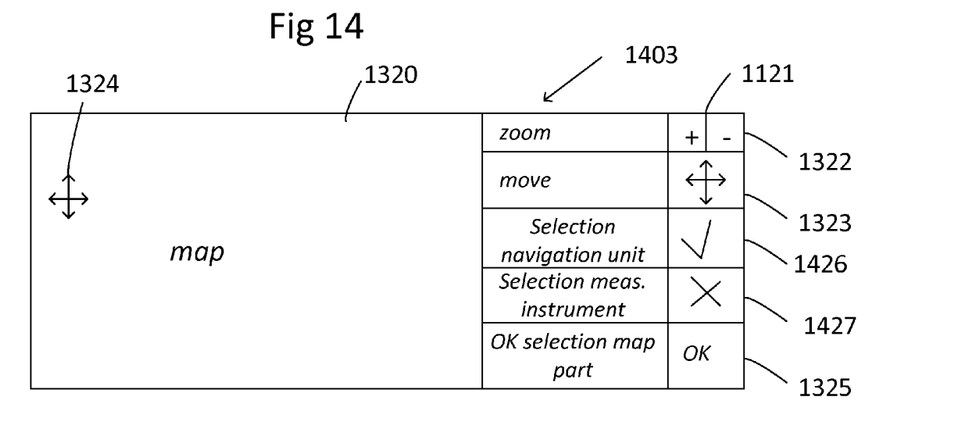
FIG. 14 illustrates schematically a second example of a display of a three dimensional map and a user interface.

FIG. 14 illustrates a user interface 1403 as discussed in relation to FIG. 11 comprising a display 1320 or screen arranged to present a geo-referenced three-dimensional map to a user. In addition, the user interface 1403 has a function for indicating whether a selected part or object in the map refers to the own position, i.e. the position of the position determining unit or whether it refers to a measurement using the measurement instrument. In the illustrated example, a first indicator 1426 is set by the user if the selected part relates to the position of the position determining unit. In this illustrated example, a second indicator 1427 is set of the selected part relates to a measurement using the measurement instrument.

The invention claimed is:

1. A position determining unit (800) for a land or sea navigating object, said position determining unit comprising:
    an accessible three dimensional map (602),
    map part selector means (803) configured to select a part of the three dimensional map (602) so as to obtain a geo-referenced position associated to the selected part,
    at least one measurement instrument (805) configured to obtain at least one of bearing or distance information related to the land or sea navigating based object,
    a computing and control unit (804) configured to (a) relate each obtained at least one of bearing or distance information to a corresponding obtained geo-referenced position and to (b) determine a geographical position of the land or sea navigating object based on the at least one of bearing or distance information and the corresponding obtained geo-referenced positions, and
    a sensor arrangement (809) configured to obtain sensor data comprising data related to a reference point associated to a corresponding obtained geo-referenced position,
    wherein the computing and control unit (804) is configured to continuously update the geographical position of the land or sea navigating object based on the determined geographical position, based on a property of the reference point in first sensor data associated to the timing of the determination of the geographical position and based on changes in the property of the reference point in continuously updated second sensor data.

2. The position determining unit according to claim 1, wherein the bearing information comprises at least one of an azimuth angle value or an elevation angle value.

3. The position determining unit (800) according to claim 1, wherein the computing and control unit (604) is configured to determine the geographical position of the land or sea navigating object in three dimensions.

4. The position determining unit according to claim 3, wherein at least one of the bearing or the distance information comprises at least three measurement values.

5. The position determining unit (800) according to claim 1, wherein the computing and control unit (804) is configured to determine the geographical position of the land or sea navigating object in two dimensions.

6. The position determining unit according to claim 5, wherein at least one of the bearing or the distance information comprises at least two measurement values.

7. The position determining unit (800) according to claim 1, wherein the computing and control unit (804) is configured to continuously update the geographical position of the land or sea navigating object based on the obtained geo-referenced position of the reference point.

8. The position determining unit (800) according to claim 1, wherein at least one of the measurement instruments (805) comprises the sensor arrangement (809).

9. The position determining unit (800) according to claim 8, wherein the sensor arrangement (809) is locked at the reference point having a corresponding obtained geo-referenced position.

10. The position determining unit (800) according to claim 1, wherein the computing and control unit (804) is configured to calibrate or reset at least one of the bearing or the position information obtained by the at least one measurement instrument (605) based on the obtained geo-referenced positions.

11. The position determining unit (800) according to claim 1, wherein the at least one measurement instrument (805) comprises at least one of a Laser Range Finder, an LRF, a radar unit, an electro-optical instrument or an optical sight.

12. The position determining unit (800) according to claim 1, wherein the obtained geo-referenced position relates to the current position of the position determining unit (800) and wherein the computing and control unit (804) is configured to determine the geographical position of the land or sea navigating object based on the obtained geo-referenced position relating to the current position of the position determining unit (800).

13. The position determining unit (800) according to claim 12, wherein the means for (803) for selecting a part of the three dimensional map (802) comprises a user interface (803) for manually indicating whether the selected part of the three dimensional map (802) relates to a current position of the position determining unit (800) or to at least one of the bearing or the distance information obtained by the at least one measurement instrument (805).

14. The position determining unit (800) according to claim 1, further comprising at least one position obtaining unit (801) configured to obtain position data related to the current position of the land or sea navigating object, and wherein the computing and control unit (804) is configured to determine the geographical position of the land or sea based object based on the position data obtained by the position obtaining unit (801).

15. The position determining unit (800) according to claim 14, wherein the computing and control unit (804) is configured to calibrate or reset the position data obtained by the at least one position obtaining unit (801) with the geo-referenced position associated with the selected part.

16. The position determining unit (800) according claim 14, wherein the at least one position obtaining unit (801) comprises at least one of an Inertial Measurement Unit, IMU (606), an odometer (607) or a receiver (808) for a radio based global positioning system.

17. The position determining unit (800) according claim 16, wherein the radio based global positioning system is a GPS.

18. The position determining unit (800) according to claim 1, wherein the computing and control unit (804) is configured to determine an uncertainty measure related to the determined geographical position of the land or sea navigating object.

19. The position determining unit according to claim 18, wherein at least one of the position obtaining unit or the measurement instrument is reset/calibrated when the uncertainty measure decreases below a pre-set value.

20. The position determining unit according to claim 1, wherein the computing and control unit (804) is configured to receive second position information related to the land or sea navigating object from a second source (808), and to determine a difference between the second position information obtained from the second source and the determined position or obtained update of the position of the land or sea based object.

21. The position determining unit (800) according to claim 20, wherein the computing and control unit (804) is further configured to detect an uncertainty in the obtained second position information when the difference exceeds a predetermined value.

22. The position determining unit (800) according claim 20, wherein the second source is a radio based global positioning system.

23. The position determining unit (800) according claim 22, wherein the radio based global positioning system is a GPS.

24. A method (900, 1000, 1100) for determining a position of a land or sea navigating object, the method comprising the steps of:
  obtaining, with at least one measurement instrument, one of bearing or distance information (971) related to the land or sea navigating object,
  determining (972) for the obtained at least one of bearing or distance information an associated part of a three dimensional map comprising three dimensional geo-referenced position data,
  obtaining a geo-referenced position (973) for each determined part of the three dimensional map,
  obtaining, with at least one position obtaining unit, position data (970) related to a current position of the land or sea navigating object, and
  determining a geographical position (974) of the land or sea navigating object based on the obtained position data (970) and the obtained at least one of bearing or distance information and corresponding obtained geo-referenced positions.

25. The method according to claim 24, wherein the bearing information comprises at least one of an azimuth angle value or an elevation angle value.

26. The method according to claim 24, wherein the geographical position of the land or sea navigating object is determined in three dimensions.

27. The method according to claim 26, wherein at least one of the bearing or distance information comprises at least three measurement values.

28. The method according to claim 24, wherein the geographical position of the land or sea navigating object is determined in two dimensions.

29. The method according to claim 28, wherein at least one of the bearing or distance information comprises at least two measurement values.

30. The method according to claim 24, wherein the obtained geo-referenced position (973) relates to the current position of the land or sea b navigating object and wherein the determining of the geographical position (974) of the land or sea navigating object is based on the obtained geo-referenced position relating to the current position of the land or sea navigating object.

31. The method according to claim 30, wherein the step of determining (972) a part of the three dimensional map comprises manually indicating whether the determined map part of the three dimensional map relates to the current position of the land or sea navigating object or at least one of the bearing or the distance information obtained by the at least one measurement instrument.

32. The method according claim 24, further comprising a step of resetting or calibrating (976) at least one of the at least one measurement instrument or position obtaining unit.

33. The method according to claim 32, wherein the step of resetting or calibrating (976) at least one of the at least one position obtaining unit or measurement instrument is based on the obtained geo-referenced position associated with at least one of the selected parts of the three-dimensional map.

34. The method according to claim 24, further comprising a step of determining an uncertainty measure (975) related to the determined position of the land or sea navigating object.

35. The method (1100) according to claim 24, further comprising
obtaining first sensor data (1191) associated to the timing of the determined geographical position, wherein the first sensor data comprises data related to a reference point associated to at least one property and associated to a corresponding obtained geo-referenced position;
repeatedly obtaining (1192) updated second reference data comprising data related to the reference point, and
obtaining (1194) an update of the geographical position of the land or sea navigating object based on the determined geographical position of the land or sea navigating object and based on a relation in the at least one property between the first sensor data and the updated second sensor data.

36. The method according to claim 35, further comprising determining (1195) an uncertainty in the obtained update of the geographical position, wherein updating of the geographical position is ended (996) when the uncertainty exceeds a predetermined threshold.

37. The method (1000) according to claim 24, further comprising steps of
obtaining second position information (1081) related to the land or sea navigating object from a different source, and
determining a difference (1082) between the second position information obtained from a different source and the determined position or obtained update of the position of the land or sea navigating object.

38. The method according to claim 37, further comprising a step of detecting (1083) an uncertainty in the obtained second position information when the difference exceeds a predetermined value.

39. The method (1000) according to claim 37, wherein the different source is a radio based global positioning system.

40. The method (1000) according to claim 39, wherein the radio based global positioning system is a GPS.

41. A position determining unit (800) for a land or sea navigating object, said position determining unit comprising:
an accessible three dimensional map (602),
map part selector means (803) configured to select a part of the three dimensional map (602) so as to obtain a geo-referenced position associated to the selected part,
at least one measurement instrument (805) configured to obtain at least one of bearing or distance information related to the land or sea navigating object, and
a computing and control unit (804) configured to (a) relate each obtained at least one of bearing or distance information to a corresponding obtained geo-referenced position and to (b) determine a geographical position of the land or sea navigating object based on the at least one of bearing or distance information and the corresponding obtained geo-referenced positions,
wherein the computing and control unit (804) is configured to calibrate or reset at least one of the bearing or the position information obtained by the at least one measurement instrument (605) based on the obtained geo-referenced positions.

42. A position determining unit (800) for a land or sea navigating object, said position determining unit comprising:
an accessible three dimensional map (602),
map part selector means (803) configured to select a part of the three dimensional map (602) so as to obtain a geo-referenced position associated to the selected part,
at least one measurement instrument (805) configured to obtain at least one of bearing or distance information related to the land or sea navigating object, and
a computing and control unit (804) configured to (a) relate each obtained at least one of bearing or distance information to a corresponding obtained geo-referenced position and to (b) determine a geographical position of the land or sea navigating object based on the at least one of bearing or distance information and the corresponding obtained geo-referenced positions,
wherein:
the obtained geo-referenced position relates to the current position of the position determining unit (800) and wherein the computing and control unit (804) is configured to determine the geographical position of the land or sea navigating object based on the obtained geo-referenced position relating to the current position of the position determining unit (800), and
the means for (803) for selecting a part of the three dimensional map (802) comprises a user interface (803) for manually indicating whether the selected part of the three dimensional map (802) relates to a current position of the position determining unit (800) or to at least one of the bearing or the distance information obtained by the at least one measurement instrument (805).

43. A position determining unit (800) for a land or sea navigating object, said position determining unit comprising:
an accessible three dimensional map (602),
map part selector means (803) configured to select a part of the three dimensional map (602) so as to obtain a geo-referenced position associated to the selected part,
at least one measurement instrument (805) configured to obtain at least one of bearing or distance information related to the land or sea navigating object,
a computing and control unit (804) configured to (a) relate each obtained at least one of bearing or distance information to a corresponding obtained geo-referenced position and to (b) determine a geographical position of the land or sea navigating object based on the at least one of bearing or distance information and the corresponding obtained geo-referenced positions, and at least one position obtaining unit (801) configured to obtain position data related to the current position of the land or sea navigating object, and wherein the computing and control unit (804) is configured to determine the geographical position of the land or sea navigating object based on the position data obtained by the position obtaining unit (801).

44. A position determining unit (800) for a land or sea navigating object, said position determining unit comprising:

an accessible three dimensional map (602), map part selector means (803) configured for selecting a part of the three dimensional map (602) so as to obtain a geo-referenced position associated to the selected part, at least one measurement instrument (805) configured to obtain at least one of bearing or distance information related to the land or sea navigating object, and a computing and control unit (804) configured to (a) relate each obtained at least one of bearing or distance information to a corresponding obtained geo-referenced position and to (b) determine a geographical position of the land or sea navigating object based on the at least one of bearing or distance information and the corresponding obtained geo-referenced positions, wherein the computing and control unit (804) is configured to determine an uncertainty measure related to the determined geographical position of the land or sea navigating object.

45. A position determining unit (800) for a land or sea navigating object, said position determining unit comprising:

an accessible three dimensional map (602), map part selector means (803) configured to select a part of the three dimensional map (602) so as to obtain a geo-referenced position associated to the selected part, at least one measurement instrument (805) configured to obtain at least one of bearing or distance information related to the land or sea navigating object, and a computing and control unit (804) configured to (a) relate each obtained at least one of bearing or distance information to a corresponding obtained geo-referenced position and to (b) determine a geographical position of the land or sea navigating object based on the at least one of bearing or distance information and the corresponding obtained geo-referenced positions, wherein the computing and control unit (804) is configured to receive second position information related to the land or sea navigating object from a second source (808), and to determine a difference between the second position information obtained from the second source and the determined position or obtained update of the position of the land or sea navigating object.

46. A method (900, 1000, 1100) for determining a position of a land or sea navigating object, the method comprising the steps of:

obtaining, with at least one measurement instrument, one of bearing or distance information (971) related to the land or sea navigating object, determining (972) for the obtained at least one of bearing or distance information an associated part of a three dimensional map comprising three dimensional geo-referenced position data, obtaining a geo-referenced position (973) for each determined part of the three dimensional map, determining a geographical position (974) of the land or sea navigating object based on the obtained at least one of bearing or distance information and corresponding obtained geo-referenced positions, and resetting or calibrating (976) the at least one measurement instrument.

47. A method (900, 1000, 1100) for determining a position of a land or sea navigating object, the method comprising the steps of:

obtaining, with at least one measurement instrument, one of bearing or distance information (971) related to the land or sea navigating object, determining (972) for the obtained at least one of bearing or distance information an associated part of a three dimensional map comprising three dimensional geo-referenced position data, obtaining a geo-referenced position (973) for each determined part of the three dimensional map, determining a geographical position (974) of the land or sea navigating object based on the obtained at least one of bearing or distance information and corresponding obtained geo-referenced positions, and determining an uncertainty measure (975) related to the determined position of the land or sea navigating object.

48. A method (900, 1000, 1100) for determining a position of a land or sea navigating object, the method comprising the steps of:

obtaining, with at least one measurement instrument, one of bearing or distance information (971) related to the land or sea navigating object, determining (972) for the obtained at least one of bearing or distance information an associated part of a three dimensional map comprising three dimensional geo-referenced position data, obtaining a geo-referenced position (973) for each determined part of the three dimensional map, determining a geographical position (974) of the land or sea navigating object based on the obtained at least one of bearing or distance information and corresponding obtained geo-referenced positions, obtaining first sensor data (1191) associated to the timing of the determined geographical position, wherein the first sensor data comprises data related to a reference point associated to at least one property and associated to a corresponding obtained geo-referenced position, repeatedly obtaining (1192) updated second reference data comprising data related to the reference point, and obtaining (1194) an update of the geographical position of the land or sea navigating object based on the determined geographical position of the land or sea navigating object and based on a relation in the at least one property between the first sensor data and the updated second sensor data.

49. A method (900, 1000, 1100) for determining a position of a land or sea navigating object, the method comprising the steps of:

obtaining, with at least one measurement instrument, one of bearing or distance information (971) related to the land or sea navigating object, determining (972) for the obtained at least one of bearing or distance information an associated part of a three dimensional map comprising three dimensional geo-referenced position data, obtaining a geo-referenced position (973) for each determined part of the three dimensional map, determining a geographical position (974) of the land or sea navigating object based on the obtained at least one of bearing or distance information and corresponding obtained geo-referenced positions, obtaining second position information (1081) related to the land or sea navigating object from a different source, and determining a difference (1082) between the second position information obtained from a different source and the determined position or obtained update of the position of the land or sea navigating object.

* * * * *

UNITED STATES PATENT AND TRADEMARK OFFICE
CERTIFICATE OF CORRECTION

| | |
|---|---|
| PATENT NO. | : 10,036,636 B2 |
| APPLICATION NO. | : 14/440492 |
| DATED | : July 31, 2018 |
| INVENTOR(S) | : Haglund et al. |

Page 1 of 1

It is certified that error appears in the above-identified patent and that said Letters Patent is hereby corrected as shown below:

In the Claims

<u>Column 14</u>
Line 39, "related to the land or sea navigating based object" should read --related to the land or sea navigating object,--

Signed and Sealed this
Sixth Day of November, 2018

Andrei Iancu
*Director of the United States Patent and Trademark Office*